United States Patent [19]

Iwahashi

[11] Patent Number: 4,983,904
[45] Date of Patent: Jan. 8, 1991

[54] BATTERY CHARGER FOR VEHICLE-MOUNTED EQUIPMENT USING ENGINE OPERATION AS START TIMING DETERMINATION

[75] Inventor: Koji Iwahashi, Tokyo, Japan
[73] Assignee: NEC Corporation, Japan
[21] Appl. No.: 410,718
[22] Filed: Sep. 21, 1989
[30] Foreign Application Priority Data
  Sep. 26, 1988 [JP] Japan .................. 63-241485
[51] Int. Cl.$^5$ .................. H02J 7/00; H02J 7/14
[52] U.S. Cl. .................. 320/15; 320/31; 320/38; 320/61
[58] Field of Search .................. 320/2, 3, 15, 31, 37, 320/38, 61, 39

[56] References Cited
U.S. PATENT DOCUMENTS

| | | |
|---|---|---|
| 3,806,790 | 4/1974 | Marshall .................. 320/15 |
| 3,829,753 | 8/1974 | Marshall .................. 320/15 X |
| 3,838,327 | 9/1974 | Uemichi et al. .................. 320/15 X |
| 4,090,122 | 5/1978 | Hoinski .................. 320/15 X |
| 4,692,680 | 9/1987 | Sherer .................. 320/3 X |

Primary Examiner—R. J. Hickey
Attorney, Agent, or Firm—Laff, Whitesel, Conte & Saret

[57] ABSTRACT

A battery charger for a vehicle-mounted equipment comprises a first sensor for detecting when the voltage of the vehicle battery is higher than a specified level. A second sensor is provided for detecting when the engine of the vehicle is running. The outputs of the sensors determine the start timing of a charging operation. A switch is connected between the vehicle battery and the equipment's rechargeable battery. A timing circuit is responsive to the output signals of the first and second sensors for causing the switch to establish a path between the batteries for an interval sufficient to charge the rechargeable battery with a current supplied from the vehicle battery.

7 Claims, 3 Drawing Sheets

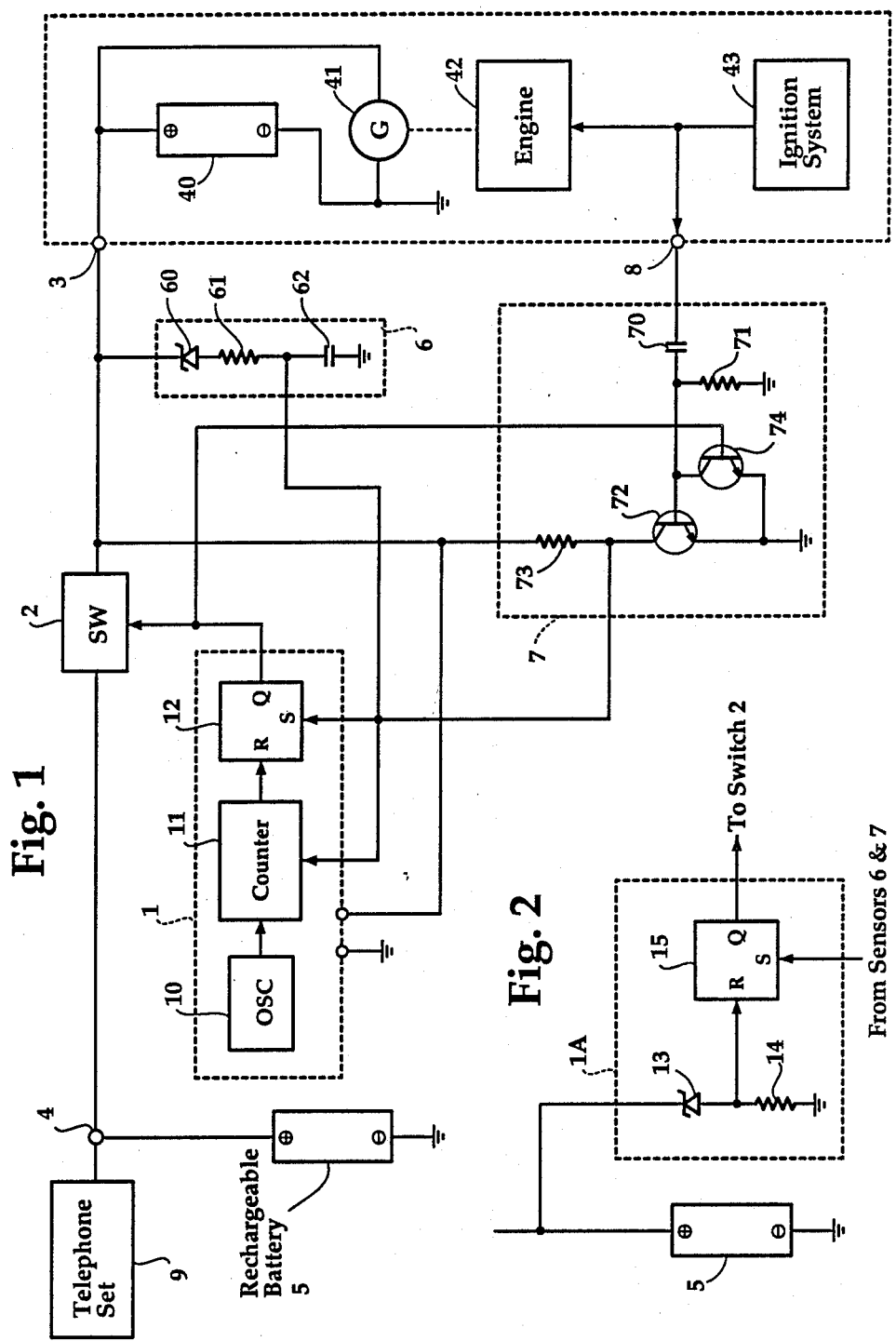

BATTERY CHARGER FOR VEHICLE-MOUNTED EQUIPMENT USING ENGINE OPERATION AS START TIMING DETERMINATION

BACKGROUND OF THE INVENTION

The present invention relates generally to battery chargers, and more specifically to a battery charger for charging the battery of a vehicle-mounted equipment with a current supplied from the vehicle battery.

With known battery chargers, the rechargeable battery of a vehicle-mounted equipment is charged with a current supplied from the automobile battery. Regardless of the voltage of the automobile battery, charging operation automatically starts when the voltage of the equipment's battery reduces to a predetermined level and terminates when the voltage rises above a specified level or a specified time interval has elapsed. Therefore, the automobile battery is often forced to discharge under low voltage conditions, causing an irrecoverable damage thereon.

SUMMARY OF THE INVENTION

It is therefore an object of the present invention to provide a battery charger for a vehicle-mounted equipment which eliminates any possibility of causing a damage on the equipment battery by starting a charging operating when the vehicle engine is running.

Since the fact that a vehicle engine is running indicates that the vehicle DC generator is driven by it and charges the battery of the vehicle, the energy of the latter is considered sufficient to supply a charging current to the equipment battery in addition to the various circuits of the vehicle. The present invention is based on this view point to determine the start timing of the charging of the equipment battery.

Specifically, the battery charger of the present invention comprises a first sensor for detecting when the voltage of the vehicle battery is higher than a specified level. A second sensor is provided for detecting when the engine of the vehicle is running. A switch is connected between the vehicle battery and the equipment's rechargeable battery. A timing circuit is responsive to output signals from the first and second sensors for causing the switch to establish a path between the batteries for an interval sufficient to charge the rechargeable battery with a current supplied from the vehicle battery.

BRIEF DESCRIPTION OF THE DRAWINGS

The present invention will be described in further detail with reference to the accompanying drawings, in which:

FIG. 1 is a block diagram of a vehicle-mounted battery charger for an automobile radio telephone set;

FIG. 2 is an illustration of a modification of FIG. 1;

DETAILED DESCRIPTION

Figure 3:
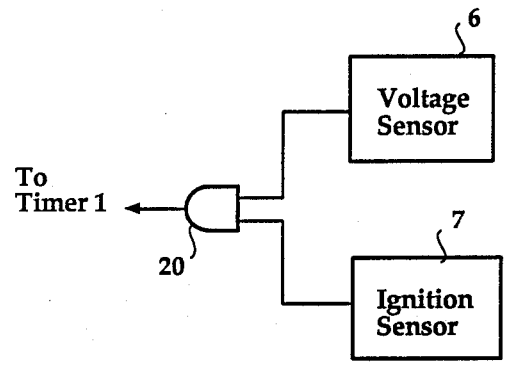
FIG. 3 is an illustration of a further modification of FIG. 1.

In FIG. 1, there is shown a battery charger for an automobile radio telephone set according to an embodiment of the present invention. The battery charger comprises a timer 1 and a switch 2 which is responsive to an output signal from the timer to establish a path from a vehicle battery 40 of an automobile through a power input terminal 3 to a power output terminal 4, through which a rechargeable battery 5 supplies DC power voltage to a vehicle-mounted equipment such as an automobile radio telephone set 9. As is well known, the vehicle battery 40 is charged with a current supplied from a DC generator 41 of the automobile when the vehicle engine 42 is running in reponse to ignition pulses supplied from the ignition system 43.

Between the power input terminal 3 and ground is connected a voltage sensor 6 which comprises a series circuit of a Zener diode 60, a resistor 61 and a capacitor 62, the junction between resistor 61 and capacitor 62 being connected to the timer 1 to apply a start signal. When the battery voltage at terminal 3 is above a specified level represented by the breakdown voltage of Zener diode 60, the latter conducts, causing a potential at the junction between resistor 61 and capacitor 62 to rise. The rising edge of this potential is applied to the timer 1 as a start signal.

Timer 1 comprises an oscillator 10, a counter for counting pulses from the oscillator and a flip-flop 12 having a reset terminal coupled to the output of the counter 11. In response to the start signal from voltage sensor 6, flip-flop 12 switches to logic-1 and counter 11 begins counting clock pulses from the oscillator 10. When interval T1, which is typically 10 hours, has elapsed from the time of application of the start signal from the voltage sensor 6, the counter 10 reaches a preset value and resets the flip-flop 12 to logic-0. During the time flip-flop 12 is at logic-1, switch 2 is turned on, coupling the input terminal 3 to the output terminal 4 to charge the battery 5 with the voltage supplied from the automobile battery. DC power voltage necessary for operating the timer 1 is supplied from the input terminal 3.

An ignition sensor 7 is provided for detecting an ignition pulse from the ignition system 43. This sensor comprises a differentiator formed by a capacitor 70, which is connected between a pulse input terminal 8 and the base of a transistor 72, and a resistor 71 which is in turn connected across the base and emitter of transistor 72. The collector of transistor 72 is connected through a resistor 73 to the power input terminal 3 on the one hand and to the reset input of timer 1 on the other, the emitter of transistor 72 being connected to ground. The ignition pulses from the ignition system 43 are supplied to terminal 8 and differentiated by capacitor 70 and resistor 71, producing a short-duration positive-going pulse at the leading edge of each ignition pulse. Transistor 72 is turned on in response to one of the positive-going pulses. The turn-on of transistor 72 causes a voltage at the collector thereof to drop, producing a negative-going pulse which is applied as a start signal to the timer 1 which responds to the rising (trailing) edge of the applied negative-going pulse. Ignition sensor 7 further includes a transistor 74 having a collector-emitter path connected in parallel across the base and emitter of transistor 72. The base of transistor 74 is connected to the output terminal of timer 1. Transistor 74 is turned on during the time the battery 5 is being charged to prevent transistor 72 from responding to subsequent ignition pulses by establishing a low-impedance path across the base and emitter of transistor 72, so that counter 11 continues a count operation.

It is seen that the timer 1 is responsive to a start signal supplied either from the voltage sensor 6 and ignition sensor 7. When the vehicle engine 42 is started and the vehicle battery voltage is lower than that specified by the voltage sensor 6 at this moment, ignition sensor 7 produces the start signal and sets the charger into a condition ready to start a charging operation. Vehicle battery 40 will eventually be charged by the DC generator 41 to a level sufficient to supply a charging current to the equipment battery 5. When this occurs, actual charging operation can be started if the equipment battery 5 is lower than the vehicle battery 40. Therefore, the presence of ignition pulses at terminal 8 indicates that the vehicle battery is capable of charging the battery 5 and, hence, the vehicle battery is prevented from discharging under low voltage conditions.

When the vehicle engine is not running, the voltage at power input terminal 3 will cause a start signal to be applied to the timer 1 if the vehicle battery voltage is higher than the voltage specified by the voltage sensor 6. Thus, battery 5 can be safely recharged from the vehicle battery when the engine is not running.

A modified form of the timer 1 is shown at 1A in FIG. 2. In this modification, the timer 1A comprises a voltage sensor formed by a Zener diode 13 and a resistor 14 connected in series across the terminals of rechargeable battery 5, the junction between Zener diode 13 and resistor 14 being connected to the reset input of a flip-flop 15. Flip-flop 15 has a set input terminal connected to the outputs of voltage sensor 6 and ignition sensor 7 and an output terminal connected to the switch 2. In a manner similar to flip-flop 12 of FIG. 1, flip-flop 15 responds to an output pulse of sensors 6 and 7 to turn on the switch 2 to initiate a charging operation. When the voltage of the charged battery 5 has exceeded a predetermined level, the Zener diode 13 is made to conduct, developing a voltage across resistor 14. This voltage resets the flip-flop 15 to terminate the charging operation.

A further modification of the present invention is shown in FIG. 3 in which the output of voltage sensor 6 is applied to an input an AND gate 20 to which the output of ignition sensor 7 is also applied to produce a coincidence pulse. This coincidence pulse is applied to the input of timer 1 as a start signal. Battery charging operation is prevented during an engine start period if the automobile battery voltage is lower than that specified by the voltage sensor 6 and if the battery charger of FIG. 1 presents an extra load to the vehicle DC generator which is critical to an engine starting operation. If this is the case, the vehicle DC generator charges the automobile battery first after starting the engine until its voltage becomes higher than the threshold of the voltage sensor 6 and allows AND gate 20 to pass an output pulse from the ignition sensor 7 to start a charging operation.

Figure 4:
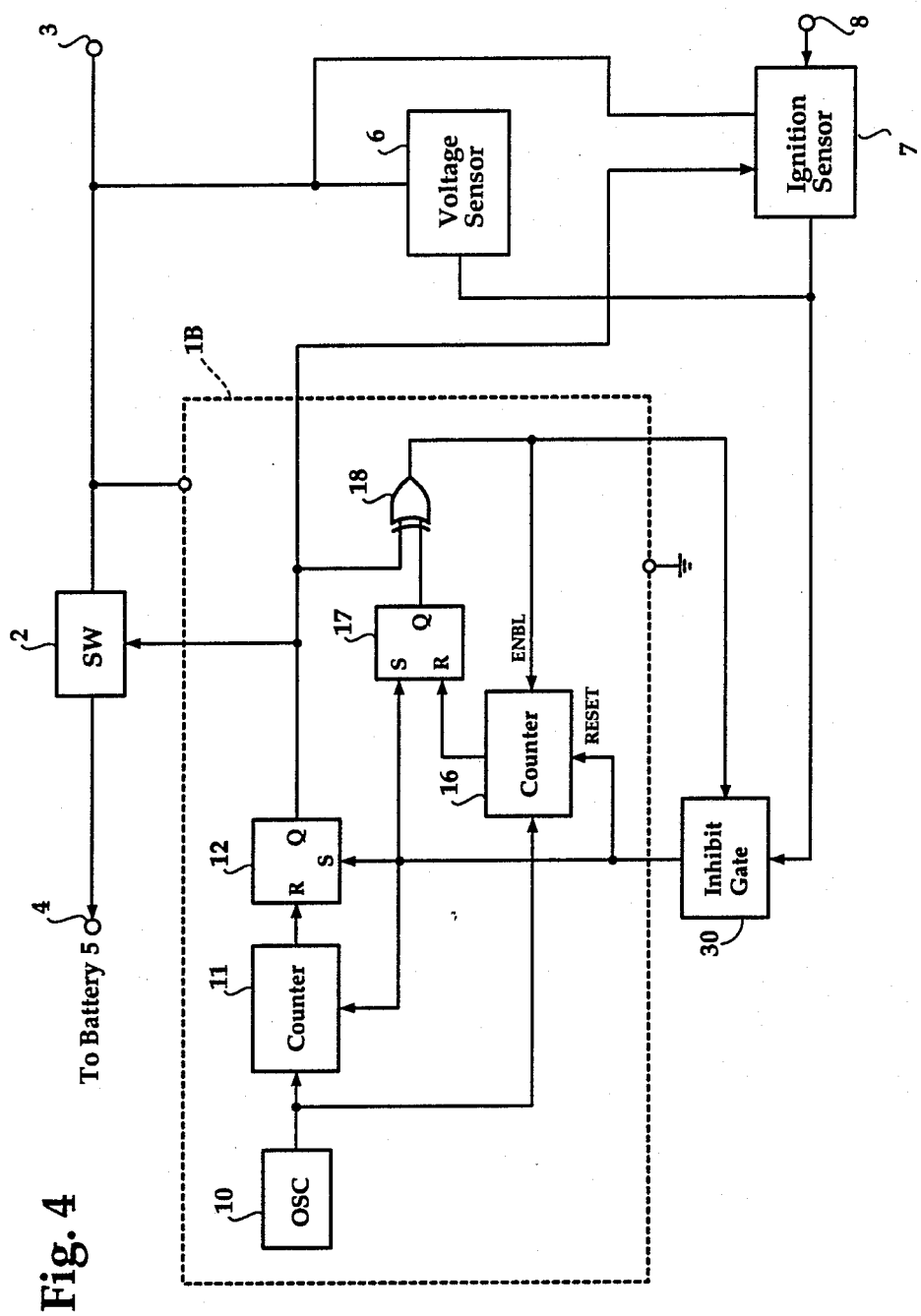
FIG. 4 is a block diagram of another modification of FIG. 1.

FIG. 4 illustrates a further modification of the invention in which the timer is shown at 1B as further including a second counter 16 for counting pulses from the oscillator 10, a second flip-flop 17 having a reset terminal connected to the output of counter 16 and a set input connected to the set input of flip-flop 12. An exclusive OR gate 18 is connected to the outputs of flip-flops 12 and 16, the output of exclusive OR gate 18 being connected to enable input of the second counter 16.

An inhibit gate 30 is provided to allow the start signal from either of the voltage and ignition sensors 6 and 7 to be applied to the set inputs of flip-flops 12 and 17 and to the reset inputs of counters 11 and 16 when the output of the exclusive OR gate 18 is at logic-0 level and prevent it from being applied to the timer 1B during an interval T2, which is longer than interval T1, immediately following the end of a charging operation.

Figure 5:
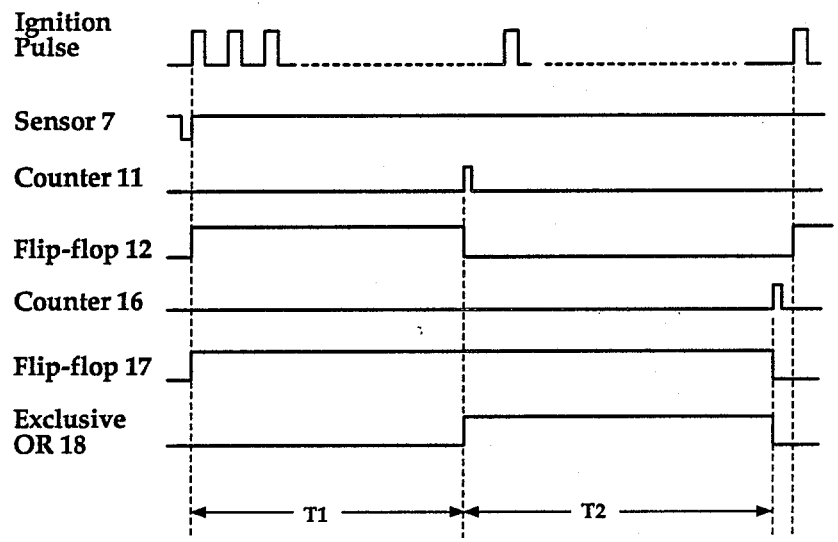
FIG. 5 is a timing digram associated with the embodiment of FIG. 4.

With the output of exclusive OR gate 18 being at logic-0, a start signal from sensor 6 or 7 causes flip-flops 12 and 17 to switch to logic-1 and resets counters 11 and 16, as illustrated in FIG. 5. At the end of interval T1, counter 11 resets flip-flop 12 to logic-0 which causes exclusive OR gate 18 to switch to logic-1, enabling the second counter 16 to start counting clock pulses. At the end of interval T2, counter 16 reaches a preset value and resets the flip-flop 17, switching the exclusive OR gate 18 to logic-0.

The foregoing description shows only preferred embodiments of the present invention. Various modifications are apparent to those skilled in the art without departing from the scope of the present invention which is only limited by the appended claims. For example, instead of ignition pulses, fuel injection pulses could equally be as well used as an indication that the vehicle engine is running. Therefore, the embodiments shown and described are only illustrative, not restrictive.

What is claimed is:

1. A battery charger for an equipment adapted to be mounted on a motor vehicle for charging a rechargeable battery of said equipment, said motor vehicle having DC generator means driven by the engine of the vehicle and an vehicle battery charged by said DC generator, comprising:
   first sensor means for detecting when voltage of said vehicle battery is higher than a specified level;
   second sensor means for detecting when said engine is running;
   switch means connected between said vehicle battery and said rechargeable battery; and
   timing means responsive to output signals from said first and second sensor means for causing said switch means to establish a path between said batteries for an interval sufficient to charge said rechargeable battery with a current supplied from the vehicle battery.

2. A battery charger as claimed in claim 1, wherein said timing means comprises a counter for periodic pulses in response to generation of an output signal from said first and second sensor means and causing said switch means to cut off said path when the count of the periodic pulses reaches a predetermined value.

3. A battery charger as claimed in claim 1, wherein said timing means comprises voltage sensor means for detecting when voltage across said rechargeable battery is higher than a specified value and causing said switch means to cut off said path when the voltage across the rechargeable battery is detected as being higher than said specified value.

4. A battery charger as claimed in claim 1, further comprising coincidence gate means for detecting that there is a coincidence between output signals from said first and second sensor means, and wherein said timing means is responsive to the detection of said coincidence for causing said switch means to establish said path.

5. A battery charger as claimed in claim 1, further comprising second timing means for defining an interval subsequent to the interval defined by the first-mentioned timing means and inhibit means for enabling the first timing means to respond to output signals from said first and second sensor means and disabling the first timing means during the interval defined by the second timing means.

6. A battery charger as claimed in claim 1, wherein said second sensor means comprises means for detecting an ignition pulse generated by said engine.

7. A battery charger as claimed in claim 1, wherein said equipment is a mobile radio telephone set and said rechargeable battery is a DC voltage source thereof.

* * * * *